United States Patent [19]

McWade

[11] Patent Number: 4,550,691

[45] Date of Patent: Nov. 5, 1985

[54] FUEL SUPPLY SYSTEM FOR INTERNAL COMBUSTION ENGINES

[76] Inventor: Duncan R. McWade, Lot 4, Kiandra Crescent, Yerrinbool, N.S.W. 2575, Australia

[21] Appl. No.: 691,876

[22] Filed: Jan. 16, 1985

[51] Int. Cl.⁴ .................. F02B 75/12; F02B 43/08
[52] U.S. Cl. .................... 123/3; 123/1 A; 123/575; 123/525
[58] Field of Search ............ 123/1 A, 3, 525, 575; 44/53, 52

[56] References Cited

U.S. PATENT DOCUMENTS

| | | | |
|---|---|---|---|
| 4,323,046 | 4/1982 | Barber | 123/1 A |
| 4,325,329 | 4/1982 | Taylor | 123/1 A |
| 4,364,337 | 12/1982 | McCann | 123/1 A |
| 4,366,781 | 1/1983 | Laub | 123/1 A |

Primary Examiner—E. Rollins Cross
Attorney, Agent, or Firm—Dowell & Dowell

[57] ABSTRACT

A method and apparatus for supplying a liquid-vapor fuel mixture to internal combustion engines which includes a first conventional petroleum fuel supply and a second vapor fuel supply consisting of combustible vapors which are obtained from a heated fermentation reservoir carried by a motor vehicle and in which combustible vapors are produced and wherein the first and second fuel supplies are selectively mixed before becoming introduced into the internal combustion engine which powers the motor vehicle.

16 Claims, 1 Drawing Figure

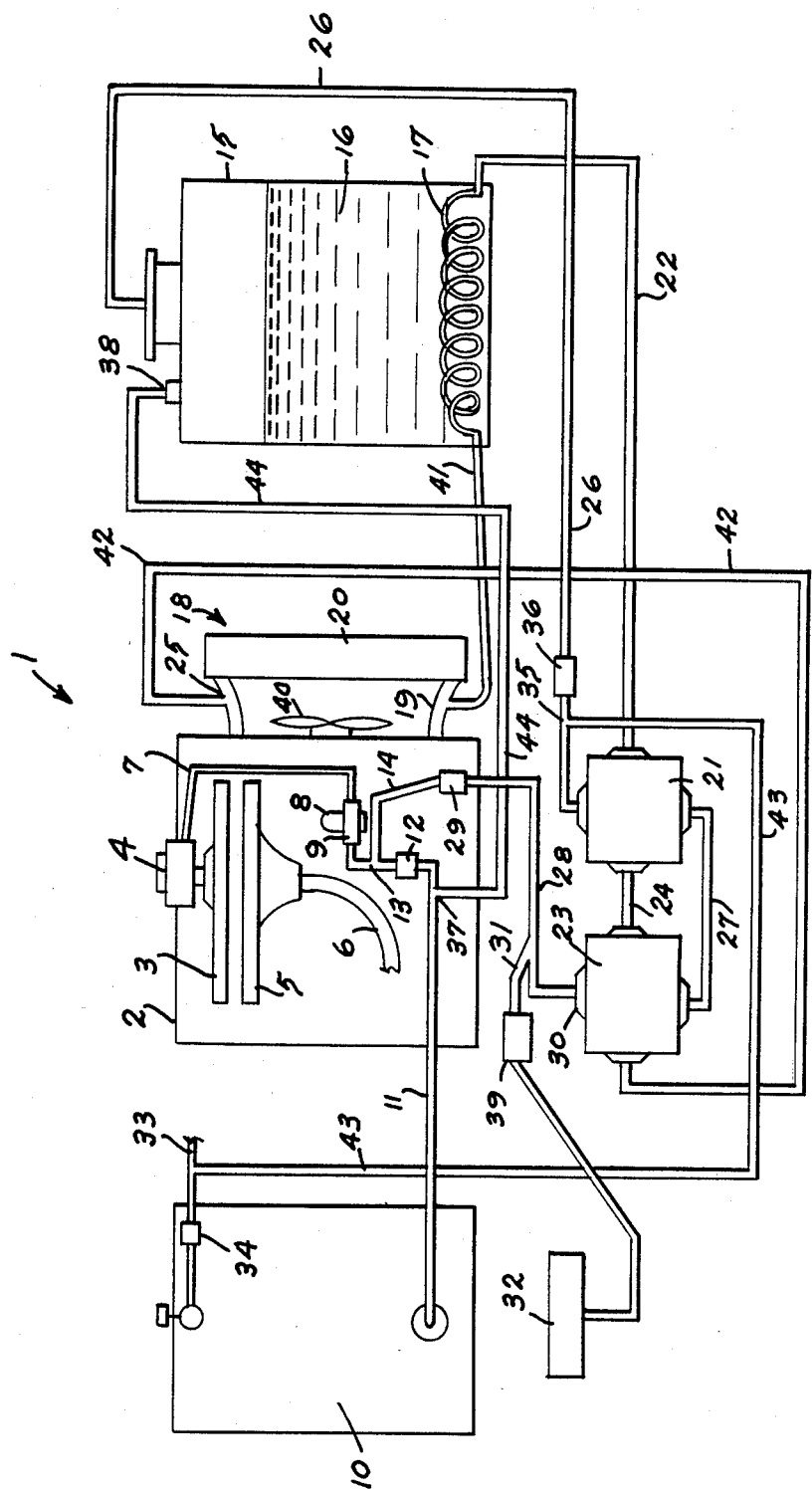

FUEL SUPPLY SYSTEM FOR INTERNAL COMBUSTION ENGINES

BACKGROUND OF THE INVENTION

1. Field of the Invention

This invention is directed to a method and apparatus for supplying a liquid-vapor fuel mixture to internal combustion engines and particularly to a method and apparatus for mixing a first conventional liquid petroleum fuel with varying quantities of a combustible gaseous fuel which is drawn from a heated fermentation reservoir carried by a motor vehicle. Additional means are provided to combine vapors drawn from the first liquid fuel supply reservoir with the vapors drawn from the fermentation reservoir and thereafter supply such vapors together with the liquid fuel to the internal combustion chamber of the vehicle. The vapors drawn from the fermentation reservoir may also be diluted to reduce their volativity by mixing such vapors with a warm air supply.

2. History of the Art

With the increasing cost of conventional petroleum fuels and the ever increasing high pollution levels which are typically encountered in major cities, there have been many developments directed to providing alternative fuel sources for automotive vehicles which will overcome these concerns. Such developments have included the drawing off of vapors from petroleum tanks and carburetor float chambers which vapors are then supplied as fuel to the engine. Other developments include the use of dual fuel systems for motor vehicles wherein mixtures of petroleum fuels and liquid petroleum gas (LPG), or petroleum and alcohol are used.

However, each of these developments have been such as to require the respective fuels to be produced at a plant or factory, then transported to filling stations where the consumer must then purchase the fuel.

SUMMARY OF THE INVENTION

The present invention is directed to a fuel system for motor vehicles having internal combustion engines in which the system includes means to supply the engine with a liquid and/or gaseous fuel mixture. Pump means are provided to supply the engine with a first liquid fuel from a first reservoir and a second vapor fuel from a heated second reservoir wherein each reservoir is located on the motor vehicle. The second vapor fuel is produced by a fermentation process within the second reservoir. The fuel vapor from the first reservoir together with an amount of heated air may also be mixed with the second vapor fuel to form an air-fuel mixture.

It is the primary object of this invention to provide a fuel system for internal combustion engines which will permit a combination of conventional liquid petroleum fuels to be used in conjunction with vaporized fuels produced in a fermentation tank carried by a motor vehicle in such a manner that a substantial savings of liquid petroleum fuel will be realized.

It is another object of the present invention to provide a method of operating internal combustion engines utilizing one or another or mixtures of a conventional liquid petroleum fuel and a vaporized fuel by-product of a fermentation process wherein such vaporized fuel may be mixed with vapor from the liquid fuel reservoir and may also be selectively diluted by the introduction of warm air to form a fuel-air mixture suitable for introduction into the carburetor of a motor vehicle.

It is yet another object of the present invention to provide a system for providing an automotive vehicle with both a conventional and secondary fuel source which may be used in varying quantities and mixtures during the operation of the vehicle power plant.

BRIEF DESCRIPTION OF THE DRAWINGS

FIG. 1 is a schematic illustration of the invention showing the tanks and conduits for conveying and combining the various fuel sources.

DESCRIPTION OF THE PREFERRED EMBODIMENT

With continued reference to the drawings, the fuel system 1 is utilized to supply fuel to an internal combustion engine 2 having an inlet manifold 3 above which is mounted a carburetor 4. Also included on the engine 2 is an exhaust manifold 5 which proceeds to atmosphere via an exhaust pipe 6 and a conventional cooling system 18 comprising a radiator 20 and a fan 40.

A fuel line 7 connects the carburetor 4 to a fluid fuel pump 8 which is suitably designed to pump both liquid and gaseous fuels to the carburetor 4. An inlet port 9 of the pump 8 is connected to a conventional liquid petroleum or gas tank 10 by a conduit 11 which is selectively opened and closed by a fuel cutoff switch 12.

Interposed in the segment 13 of the conduit 11, between the inlet port 9 and the fuel cutoff switch 12, is an alternative fuel line 14, which feeds a combustible gaseous or vaporized fuel to the fuel pump 8. The combustible gaseous or vaporized fuel is produced in a fermentation tank or reservoir 15 by the accelerated fermentation of a "mash" 16 which is placed therein.

The fermentable mash may comprise such organic substances as barley, fruit, sugar, and yeast, or any other substances that produce a combustible gas on fermentation. As the normal rate of fermentation by the yeast of such substances is not sufficient to provide enough combustible gas, such as ethyl hydroxide or other alcohol vapors, to fuel the engine 2, a further ingredient such as additional bacteria is added in order to accelerate the fermentation of the mash 16. The size of the tank 15 and the quantities of the fermentation materials and bacteria accelerator will of course depend upon the desired gaseous or vapor output desired and will vary depending upon the size and type of internal combustion engine being used.

For fermentation to occur, it is also necessary for the mash 16 to be raised to and maintained at a temperature of approximately at least 30 degrees Celsius. In order to achieve this temperature, a heating coil 17 is located within the fermentation tank or reservoir 15. Water from the cooling system 18 is directed to and flows through the coil 17 after the water is withdrawn from the radiator 20 at a radiator outlet 19 via a conduit 41. The water passes through the coil 17 to a first heat exchanger 21 via a conduit 22 and then to a second heat exchanger 21 via a conduit 22 and finally is returned to an inlet 25 of the radiator 20 through conduit 42.

The combustible gas or vapor produced in the tank 15 is conveyed to the fuel pump 8 by means of conduits 26 and 27 which extend through the first and second heat exchangers 21 and 23. As the gas or vapor exits the second heat exchanger 23, it is conveyed by conduit 28 to a spring loaded ball valve 29. The ball valve 29 acts as a metering and non-return valve and is adjusted to close in response to deceleration of the engine 2. The ball valve 29 thus prevents the intake of the vaporized fuel into the engine 2 thereby saving fuel. From the ball valve 29 the combustible gas proceeds to the inlet port 9 of the fuel pump by way of alternative fuel line 14.

Interposed along the conduit 28, intermediate the ball valve 29 and the outlet 30 of the second heat exchanger 23, is a conduit 31 which directs warm air (once the engine 2 has heated up) from the atmosphere surrounding the engine 2, via a filter 32 and a non-return valve 39. The filter 32 should be located at a height greater than that of the fuel inlet to the engine 2, being approximately the same level as the inlet manifold 3. The warm air entering through the filter 32 mixes with the gaseous or vaporized fuel to produce a diluted combustible gas/air mixture. The mixing of warm air should be done as the combustible gas has a high octane rating and is very volatile on its own and therefore the vapor should be diluted to reduce the volatility of the combustible gas before it is introduced into the engine.

Also mixed with the combustible gases or vapors are the petroleum vapors drawn from the liquid petroleum or gas tank 10 via a conduit 33 which is open to atmosphere and which has a non-return valve 34. The vapors are withdrawn downstream of the non-return valve 34 by way of a conduit 43 and directed to a point 35 which is upstream of the first heat exchanger 21 and downstream of a non-return valve 36 placed on the conduit 26. In this manner, the petroleum vapors are mixed with the combustible gas or vapor produced in the fermentation tank 15.

The combustible gas produced in the tank 15 may be directly mixed with the liquid petroleum supply to the engine by connecting the tank 15 with the liquid fuel supply line 11 by way of a conduit 44 which intersects the supply line 11 at 37. This direct supply of vaporized fuel will occur when the pressure in the tank 15 is sufficient to allow the combustible gas or vapor to overcome a pressure relief valve 38 located in the top of the tank 15.

The pressure relief valve 38 ensures that the combustible gas will not build up to a dangerous pressure when the combustible gas or vapor is not being used. This is necessary as the combustible gas will continue to be produced and the pressure in the tank 15 will continue to rise due to the continual heating of the combustible gas or vapors by the first and second heat exchangers 21, 23.

The fuel cutoff switch 12 operates when the amount of combustible gas or vapors produced in the tank 15 and fed to the carburetor 4, in addition to the liquid petroleum fuel being fed to the engine 2, exceed the air/fuel ratio (flooding) thereby cutting off liquid fuel supply from the tank 10.

The foregoing describes only one embodiment of the present invention and modifications, by persons skilled in the art, can be made thereto without departing from the scope of the present invention.

For example, the order in which hot water from the radiator 20 is used can be changed so that the water passes first through the heat exchangers and then to the tank 15. Also, the combustible gas must go through a metering and non-return valve 29, which could be located in the carburetor rather than in the line 14 as in the preferred embodiment. If it is desired to feed the combustible gas directly into the inlet manifold 3, then it would be necessary to have a metering valve 29 in the line 14.

In addition to the foregoing, although the drawing depicts an internal combustion engine having a carburetor, the invention could be equally adapted for use in diesel engines where the gaseous fuel could be supplied directly with the standard diesel fuel under pressure to the engine.

I claim:

1. A fuel system for a motor vehicle having an internal combustion engine, said system comprising carburetor means to supply said engine with an air-fuel mixture; pump means to supply said carburetor means with a first liquid fuel from a first reservoir and a second vapor fuel from a heated second reservoir, each of said first and second reservoirs being located on said motor vehicles, said second fuel being produced by fermentation within said second reservoir, means for withdrawing vapor given off by said first liquid fuel in said first reservoir and means for mixing air and said vapor given off by said first liquid fuel with said second vapor fuel being supplied to said carburetor means by said pump means.

2. The fuel system of claim 1 wherein said second vapor fuel from said heated second reservoir is further heated by at least one heat exchange means.

3. The fuel system of claim 2 including a pressure relief valve mounted to said second reservoir to permit said second vapor fuel to escape from said second reservoir.

4. The fuel system of claim 3 in which said second vapor fuel which escapes said second reservoir through said pressure relief valve is mixed into said first liquid fuel.

5. The fuel system of claim 4 including a first liquid fuel cutoff switch.

6. The fuel system of claim 2 including a non-return valve located between said at least one heat exchange means and said carburetor means, means to adjust said non-return valve means to adjust the supply of said second vapor fuel to said carburetor means.

7. A fuel system for automotive vehicles having internal combustion engines and radiators comprising a first liquid fuel reservoir, first conduit means for introducing liquid fuel from said first liquid fuel reservoir to the engine, a second vapor fuel reservoir, said second vapor fuel reservoir containing a fermentable material, a first heat exchange means located within said second vapor fuel reservoir, means for connecting said first heat exchange means to the radiator of the vehicle so that hot water from the radiator passes therethrough, at least one second heat exchange means located remote from said second vapor fuel reservoir, a first vapor conduit extending from said second vapor fuel reservoir through said second heat exchange means so as to conduct vapor fuel produced in said second vapor fuel reservoir therethrough, second vapor conduit means extending between said second heat exchange means and a fuel mixing means, said fuel mixing means being located along said first conduit means so that said liquid fuel and said vapor fuel are mixed before passing from said first conduit means into the engine.

8. The fuel system of claim 7 including an air supply means communicating with said second vapor conduit between said second heat exchange means and said mixing means whereby air is pre-mixed with said vapor fuel.

9. The fuel system of claim 8 including means for mixing vapor within said first liquid fuel reservoir to said vapor fuel produced in said second vapor fuel reservoir.

10. The fuel system of claim 9 including a vapor fuel supply valve mounted within said second vapor conduit to reduce the vapor fuel flow to said mixing means when the vehicle engine is decelerated.

11. The fuel system of claim 10 including hot water conduit means for connecting said second heat exchange means between said first exchange means and the vehicle radiator.

12. The fuel system of claim 11 including a direct vapor conduit means connecting said second vapor fuel reservoir to said first conduit means, and pressure relief valve means for permitting vapor fuel flow through said direct vapor conduit means upon the achievement of a predetermined pressure within said second vapor fuel reservoir.

13. A method of producing a fuel-air mixture for an internal combustion engine of a motor vehicle, said method comprising the steps of:
   (a) placing fermentable products within a heated reservoir located on said motor vehicle;
   (b) applying heat to said reservoir and thereby fermenting a first fuel;
   (c) drawing off said first fuel as a vapor from said reservoir and mixing said first fuel vapor with a second fuel vapor given off by a liquid fuel contained in a second reservoir located on said motor vehicle to form a vaporous fuel mixture;
   (d) adding said vaporous fuel mixture to said liquid fuel as said liquid fuel passes from said second reservoir to the internal combustion engine.

14. The method of claim 13 including the additional step of mixing air with said vaporous fuel mixture to form a fuel-air mixture which is added to said liquid fuel.

15. The method of claim 14 including the additional step of reheating said vaporous fuel drawn off of said fermenting reservoir.

16. The method of claim 13 including the additional step of adding a fermentation accelerating bacteria to said fermenting reservoir.

* * * * *